(12) United States Patent
Brown et al.

(10) Patent No.: US 7,588,712 B2
(45) Date of Patent: *Sep. 15, 2009

(54) THROTTLED-CORE-CENTERING INJECTION MOLDING

(75) Inventors: Paul Philip Brown, Ramona, CA (US); Jens Ole Sorensen, Rancho Santa Fe, CA (US)

(73) Assignee: Sorensen Research and Development Trust, San Diego, CA (US)

( * ) Notice: Subject to any disclaimer, the term of this patent is extended or adjusted under 35 U.S.C. 154(b) by 246 days.

This patent is subject to a terminal disclaimer.

(21) Appl. No.: 11/631,756

(22) PCT Filed: Jun. 24, 2005

(86) PCT No.: PCT/US2005/022867

§ 371 (c)(1), (2), (4) Date: Jan. 5, 2007

(87) PCT Pub. No.: WO2006/019528

PCT Pub. Date: Feb. 23, 2006

(65) Prior Publication Data

US 2007/0222118 A1    Sep. 27, 2007

Related U.S. Application Data

(60) Provisional application No. 60/558,227, filed on Jul. 15, 2004.

(51) Int. Cl.
*B29C 45/36* (2006.01)

(52) U.S. Cl. ................. 264/328.7; 264/328.12

(58) Field of Classification Search .......... 264/328.7, 264/328.12
See application file for complete search history.

(56) References Cited

U.S. PATENT DOCUMENTS

| 3,281,010 A | 10/1966 | Moore et al. |
| 4,959,005 A * | 9/1990 | Sorensen ............... 425/577 |
| 4,960,557 A | 10/1990 | Sorensen |
| 5,149,482 A * | 9/1992 | Sorensen ............... 264/255 |
| 6,841,104 B2 * | 1/2005 | Brown et al. ........... 264/40.5 |

(Continued)

FOREIGN PATENT DOCUMENTS

EP        1327511       *  7/2003

(Continued)

*Primary Examiner*—Jill L Heitbrink
(74) *Attorney, Agent, or Firm*—Edward W. Callan

(57) ABSTRACT

In a method of injection molding a plastic product having a base wall and a sidewall (24), wherein plastic injected into a base-wall section of the mold cavity is conducted through a flow guide (28) in the base-wall section and thence into a sidewall section (24) of the mold cavity, a portion of a base-wall section flow guide is shaped by partially opposing a row of successive recesses (33) in a first mold part with a series of successive recesses (34) in a second mold part, with the recesses in the first mold part being so staggered with respect to the recesses in the second mold part as to provide a chain of overlapping recesses that form a sequence of variable-opening throttles (30) having openings that can vary whenever the alignment between the first and second mold parts varies. The recesses (34) in the second mold part are more than the recesses (33) in the first mold part.

15 Claims, 7 Drawing Sheets

U.S. PATENT DOCUMENTS

| | | | | |
|---|---|---|---|---|
| 6,936,213 B1 * | 8/2005 | Brown | ................... | 264/328.1 |
| 7,175,789 B2 * | 2/2007 | Brown et al. | ............... | 264/40.5 |
| 7,402,267 B2 * | 7/2008 | Brown et al. | ............... | 264/40.5 |
| 2003/0132551 A1 | 7/2003 | Brown et al. | | |

FOREIGN PATENT DOCUMENTS

| | | | |
|---|---|---|---|
| JP | 2003-225933 | * | 8/2003 |

* cited by examiner

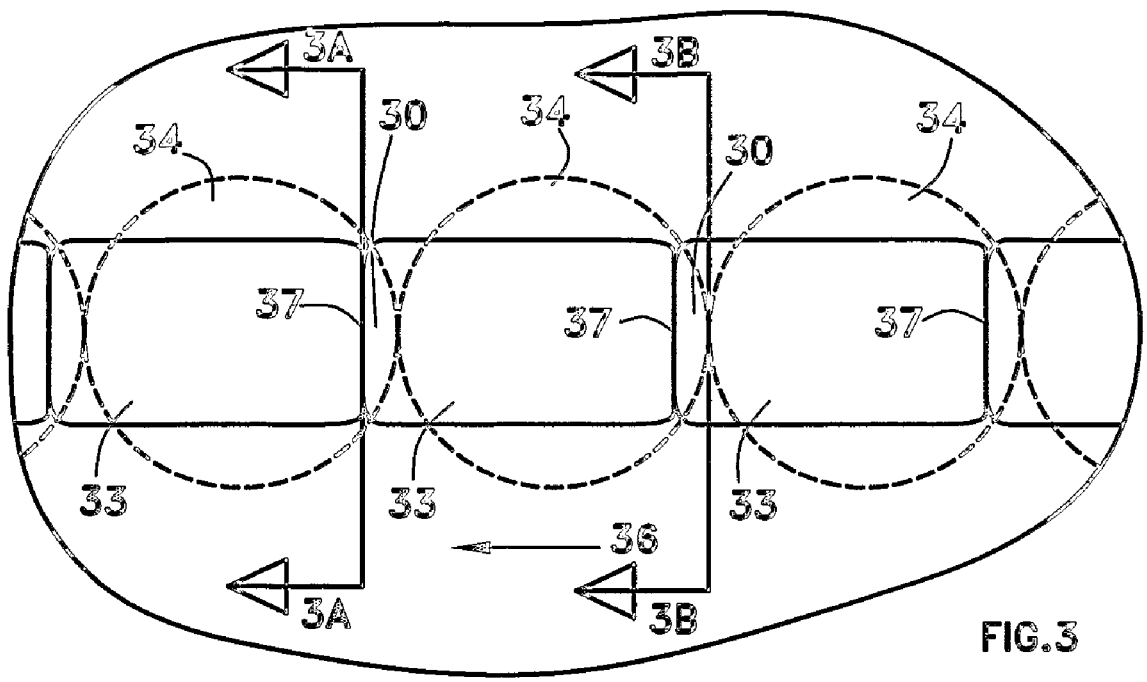
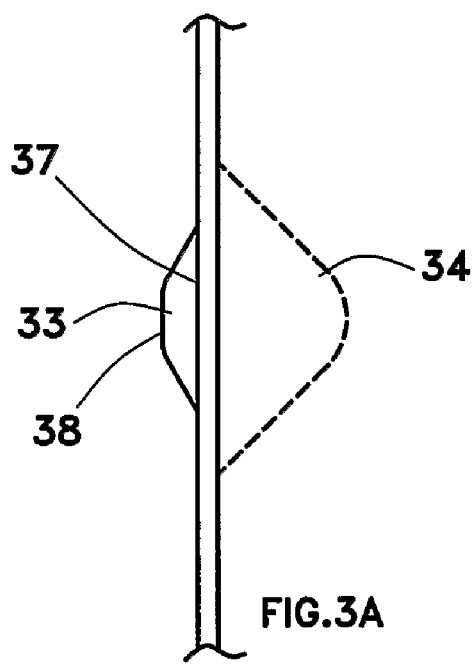 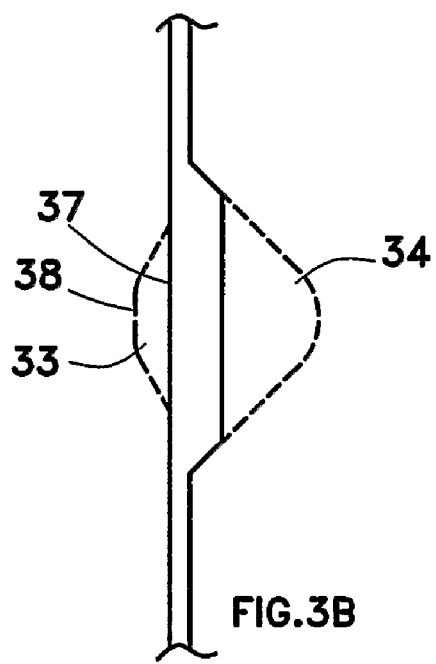
FIG. 3
FIG. 3A
FIG. 3B

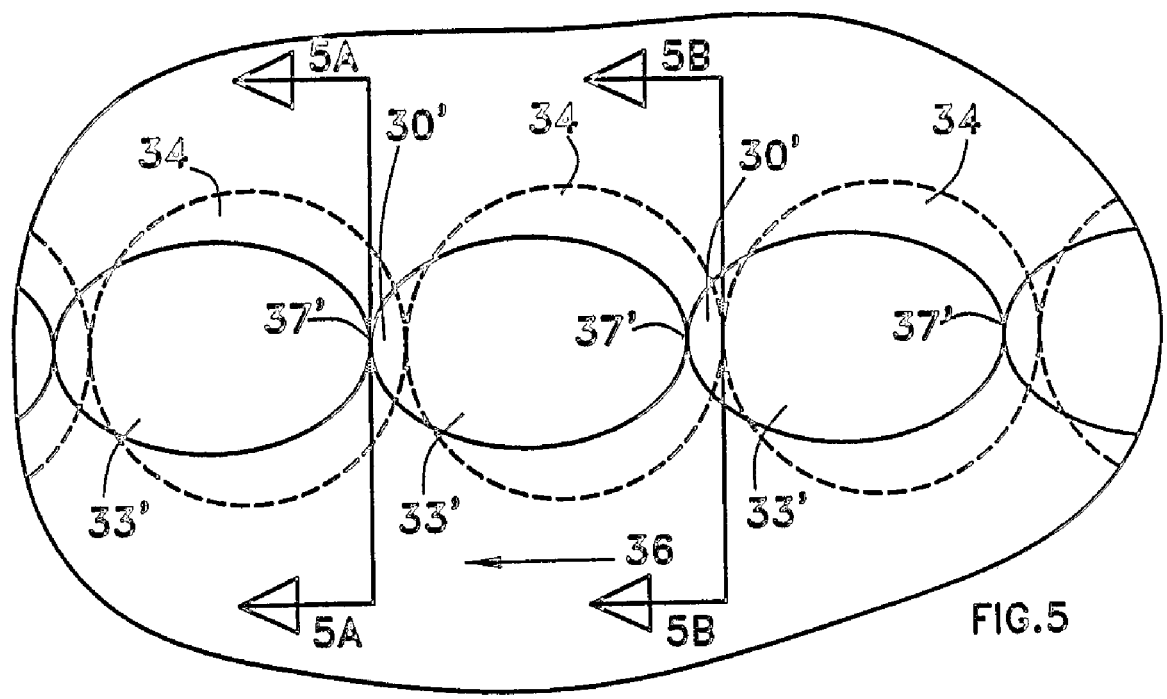
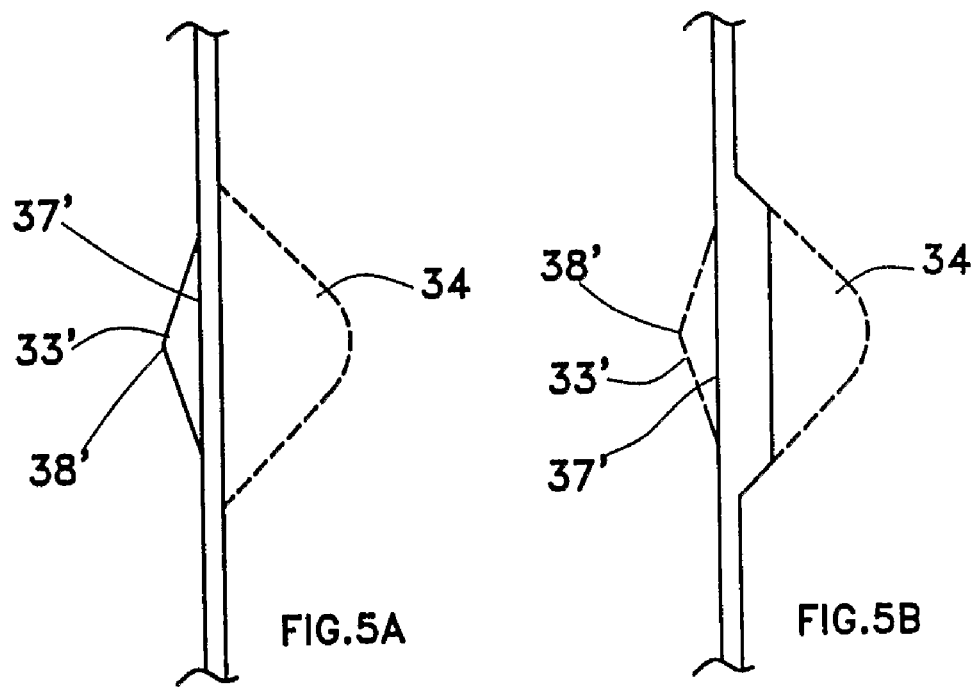

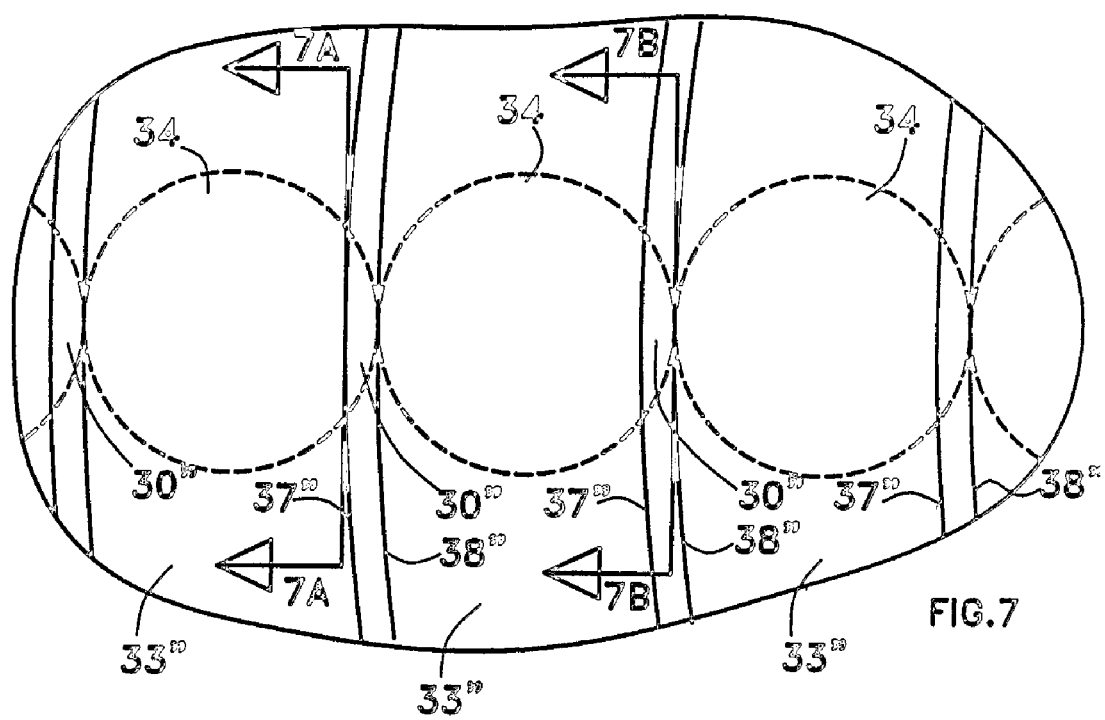
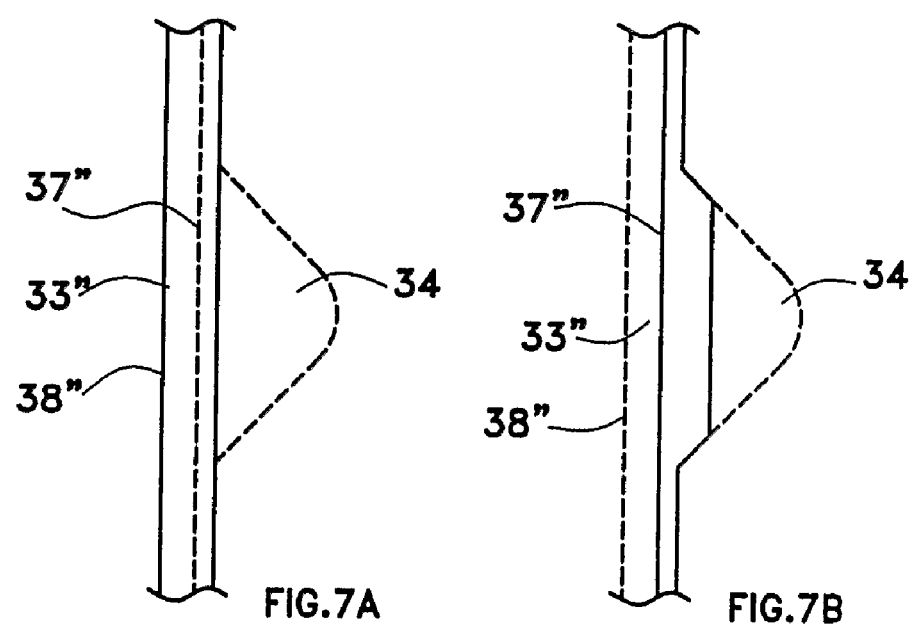

THROTTLED-CORE-CENTERING INJECTION MOLDING

CROSS-REFERENCE TO RELATED APPLICATION

For the United States of America only, this is a continuation of U.S. Provisional Patent Application No. 60/588,227 filed Jul. 15, 2004.

BACKGROUND OF THE INVENTION

The present invention generally pertains to injection molding of plastic products and is particularly directed to adjusting flow of injected plastic material and/or maintaining alignment of mold parts by steering at least one of the mold parts during injection molding of a plastic product having a base wall and a sidewall.

Various methods and apparatus for adjusting flow of injected plastic material and/or maintaining such an alignment by steering at least one of the mold parts during injection of fluid plastic material are described in U.S. Pat. Nos. 3,375,554 to Blumer, 3,397,266 to Ayres, 3,829,548 to Edwards, 3,882,212 to Edwards, 3,995,008 to Spiegelberg, 4,264,295 to Hingley, 4,467,994 to Sorensen and 4,657,141 to Sorensen, 4,959,005 to Sorensen, and European Patent Publication No. 0 347 837 A2.

SUMMARY OF THE INVENTION

The present invention provides a method of injection molding a plastic product having a base wall and a sidewall, the method comprising the steps of:

(a) shaping a mold cavity by combining a first mold part and a second mold part in opposition to one another;

(b) injecting fluid plastic material into a base-wall section of the mold cavity; and (c) conducting said injected plastic material through at least one flow guide in the base-wall section and thence into a sidewall section of the mold cavity;

wherein step (a) comprises the step of:

(d) shaping a portion of a given said base-wall section flow guide by partially opposing a row of successive recesses in the first mold part with a series of successive recesses in the second mold part with the recesses in the first mold part being so staggered with respect to the recesses in the second mold part as to provide a chain of overlapping recesses that form a sequence of variable-opening throttles having openings that can vary within the given flow guide whenever the alignment between the combined first and second mold parts varies in response to variations in the thickness of a region of the sidewall section into which injected plastic material is conducted from the given flow guide so that upon an increase in the thickness of said region the openings of said throttles in the given flow guide decrease and so that upon a decrease in the thickness of said region the openings of said throttles in the given flow guide increase;

wherein the recesses in the second mold part are shallow in relation to the recesses in the first mold part.

The surface of a product that is shaped by the more shallow recesses in the second mold part may be less disruptive in appearance and/or to touch.

Also, it is less difficult to remove solid and semi-fluid particulate matter, such as some foods, from a surface of a product that is shaped by the more shallow recesses in the second mold part.

Additional features of the present invention are described with reference to the detailed description of the preferred embodiments.

BRIEF DESCRIPTION OF THE DRAWING

FIG. 3 is an enlarged view of encircled portion 3 of the end view of the mold cavity shown in FIG. 2, with said enlarged view better illustrating a portion of the chain of overlapping recesses that form a sequence of variable-opening throttles.

FIG. 3A is a sectional view taken along line 3A-3A in FIG. 3.

FIG. 3B is a sectional view taken along line 3B-3B in FIG. 3.

FIG. 5 is an enlarged view of encircled portion 5 of the end view of the mold cavity shown in FIG. 4, with said enlarged view better illustrating a portion of the chain of overlapping recesses that form a sequence of variable-opening throttles.

FIG. 5A is a sectional view taken along line 5A-5A in FIG. 5.

FIG. 5B is a sectional view taken along line 5B-5B in FIG. 5.

FIG. 7 is an enlarged view of encircled portion 7 of the end view of the mold cavity shown in FIG. 6, with said enlarged view better illustrating a portion of the chain of overlapping recesses that form a sequence of variable-opening throttles.

FIG. 7A is a sectional view taken along line 7A-7A in FIG. 7.

FIG. 7B is a sectional view taken along line 7B-7B in FIG. 7.

DETAILED DESCRIPTION

Figure 1:
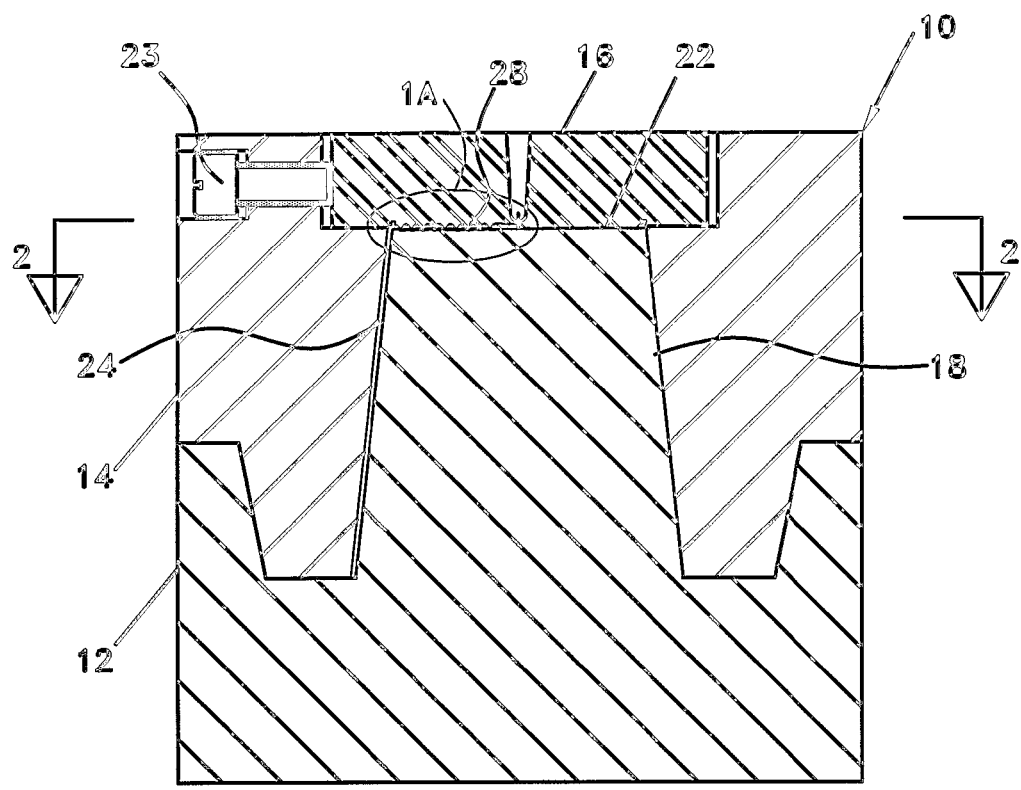
FIG. 1 is a sectional view of a preferred embodiment of a mold according to the present invention, taken along line 1-1 in FIG. 2.

Referring to FIG. 1, a preferred embodiment of the mold 10 includes a core mold part 12, a stationary cavity mold part 14 and an adjustable cavity mold part 16 for shaping a mold cavity 18 for forming a hollow symmetrical thin-wall plastic product, such as a drink cup, and a gate 20 from which fluid plastic material can be injected into a base-wall section 22 of the mold cavity 18 when the adjustable cavity mold part 16 and the core mold part 12 are combined in an aligned opposition to one another. At least three screws 23 are symmetrically disposed adjacent the side of the adjustable cavity mold part 16 for initializing the position of the adjustable cavity mold part 16 to adjust the alignment between the adjustable cavity mold part 16 and the core mold part 12.

In a preferred alternative embodiment (not shown), the initial alignment between the adjustable cavity mold part 16 and the core mold part 12 is adjusted by use of an apparatus that includes first and second concentric rings for adjusting the alignment between the stationary cavity mold part 14 of the cavity mold part and the adjustable cavity mold part 16. The first eccentric ring has a first edge disposed in slideable contact with the adjustable cavity mold part 16. The second eccentric ring has a first edge disposed in slideable contact with the stationary cavity mold part 14, and has a second edge disposed in slideable contact with a second edge of the first eccentric ring. The contact portions of each such edge are circumscribed by a respective circle. By rotating both eccentric rings, the relative positions of the adjustable cavity mold part 16 and the stationary cavity mold part 14 are adjusted in accordance with desired two-dimensional coordinates. Such apparatus is more completely described in copending U.S. patent application Ser. No. 10/715,618 filed Nov. 18, 2003 by Paul Philip Brown, one of the inventors of the present invention. The disclosure of application Ser. No. 10/715,618 is incorporated herein by reference thereto. Terms of language that are used both herein and in application Ser. No. 10/715,618 do not necessarily have the same meaning herein as in the context of said application.

In another alternative embodiment (not shown), the adjustable cavity mold part is attached to a symmetrical plurality of at least three pistons within a corresponding plurality of hydraulic cylinders for variable positioning of the adjustable cavity mold part in order to adjust the alignment between the adjustable cavity mold part and the core mold part. The position of the adjustable cavity mold part is initialized prior to commencement of a production run; and in some, but not all embodiments, (not shown) the position of the adjustable cavity mold part is also varied dynamically during a production run by varying the relative hydraulic fluid flows and/or pressures in the respective cylinders to further adjust the alignment between the adjustable cavity mold part and the core mold part in response to variations in injection pressures in different portions of the sidewall section of the mold cavity as sensed by a plurality of symmetrically disposed side mold pressure sensors. The variations of the relative hydraulic fluid flows and/or pressures in response to the sensed variations in the sidewall-section injection pressures are controlled by a computer.

In still another alternative embodiment (not shown), the mold 10 does not include an adjustable cavity mold cavity part for shaping any portion of the base-wall section 22. In this alternative embodiment, the mold cavity is shaped by a combination of a core mold part and a stationary cavity mold part.

Referring to FIGS. 1, 1A, 1B, 2, 3, 3A and 3B, in one preferred embodiment, the mold cavity 18 includes the base-wall section 22 and a sidewall section 24. The base-wall section 22 includes an inlet section 25 adjacent the gate 20, an inner circular flow guide 26 encircling the inlet section 25 and a plurality of generally radial flow guides 28 for conducting the injected plastic material from the inner circular flow guide 26, through the base-wall section 22 and thence into the sidewall section 24.

Each of the base-wall-section flow guides 28 includes a sequence of variable-opening throttles 30 through which the injected plastic material is conducted to the sidewall section 24. The sidewall section 24 includes a plurality of thin-wall sectors 31 and a plurality of flow guides 32 respectively extending from the plurality of throttled base-wall-section flow guides 28 for directing the flow of some of the injected plastic material to the thin-wall sectors 31 of the sidewall-section 24.

A portion of each base-wall section flow guide 28 is shaped by partially opposing a row of successive recesses 34 in the adjustable cavity mold part 16 with a row of successive recesses 33 in the core mold part 12. The recesses 34 in the adjustable cavity mold part 16 are so staggered along the direction of conduction 36 within a given individual base-wall-section flow guide 28 with respect to the recesses 33 in the core mold part 12 as to provide a chain of overlapping recesses 33, 34 that form a sequence of variable-opening throttles 30 having openings that can vary within the given flow guide 28 whenever the alignment between the combined mold parts 14, 16 varies in response to variations in the thickness of a region 42 of the sidewall section 24 into which injected plastic material is conducted from the given individual flow guide 28 so that upon an increase in the thickness of such region 42 the openings of the throttles 30 in the given flow guide 28 decrease and so that upon a decrease in the thickness of such region 42 the openings of the throttles 30 in the given flow guide 28 increase.

The opening distance of an individual throttle 30 is equal to the square root of the sum of the square of the minimum width W of the stagger of the opposed recesses 33, 34 and the square of the separation S between the combined core mold part 12 and the adjustable cavity mold part 16 in the region of minimum stagger of the opposed recesses 33, 34. Preferably, in order to inhibit damage to the opposed core mold part 12 and adjustable cavity mold part 16 when the mold is compressed by a requisite clamping force, the shortest distance of separation within the mold cavity 18 in the direction of mold closure 40 when the mold is not clamped is larger than the elastic compression distance of the mold cavity 11 when the mold 10 is compressed by the requisite clamping force.

The width of a given throttle 30 is not more than the width of the overlapping recesses 33, 34 that form the given throttle 30.

The recesses 33 in the core mold part 12 are shallow in relation to the recesses 34 in the adjustable cavity mold part 16.

The depth of the individual the successive recesses 33 in the core mold part 12 preferably is not more than approximately twenty-five-percent of the depth of the individual successive recesses 34 in the adjustable cavity mold part 16. The depth of an individual recess 33, 34 is measured to the bottom of the recess 33, 34 at a right angle from a plane containing opposing edges of the respective recess 33, 34. In some embodiments the depth of the individual the successive recesses 33 in the core mold part 12 is more than approximately twenty-five-percent of the depth of the individual successive recesses 34 in the adjustable cavity mold part 16. The bottom of an individual recess 33 is shown at 38.

In one preferred embodiment, in which the mold cavity 18 is dimensioned for injection molding a thin-wall plastic product, the depth of the individual successive recesses 33 in the core mold part 12 is not more than approximately one-quarter millimeter. In another such embodiment, the depth of the individual successive recesses 33 in the adjustable core mold part 12 is not more than approximately one-half millimeter. In other preferred embodiments, in which the mold cavity 18 is not dimensioned for injection molding a thin-wall plastic product, the depth of the individual successive recesses 33 in the core mold part 12 is more than approximately one-half millimeter.

The declining portions of the individual successive recesses 33 in the core mold part 12 do not decline by more than approximately forty-five degrees with respect to a plane containing opposing edges of the individual recess in the respective direction of declination. Accordingly, the surface of a product that is shaped by such recesses in the second mold part may be less disruptive in appearance and/or to touch; and it is less difficult to remove solid and semi-fluid particulate matter, such as some foods, from a surface of a product that is shaped by such recesses in the second mold part.

At least one portion 35 of individual successive recesses 33 in the core mold part 12 that declines from an edge 37 of an individual recess 33 in the direction of conduction 36 for the given flow guide 28 does not incline by more than approximately ten degrees with respect to a plane containing opposing edges of the individual recess in the direction 36.

At least a plurality of the recesses 34 in the adjustable cavity mold part 16 adjoin adjacent recesses 34 at right angles in the direction of conduction 36 for the given flow guide 28.

In the preferred embodiment shown in FIGS. 2, 3, 3A and 3B, the recesses 34 in the adjustable cavity mold part 16 are circular in the approximate broad dimension of the base-wall section 22 and the recesses 33 in the core mold part 12 are generally rectangular in such dimension, but with rounded corners.

Figure 1A:
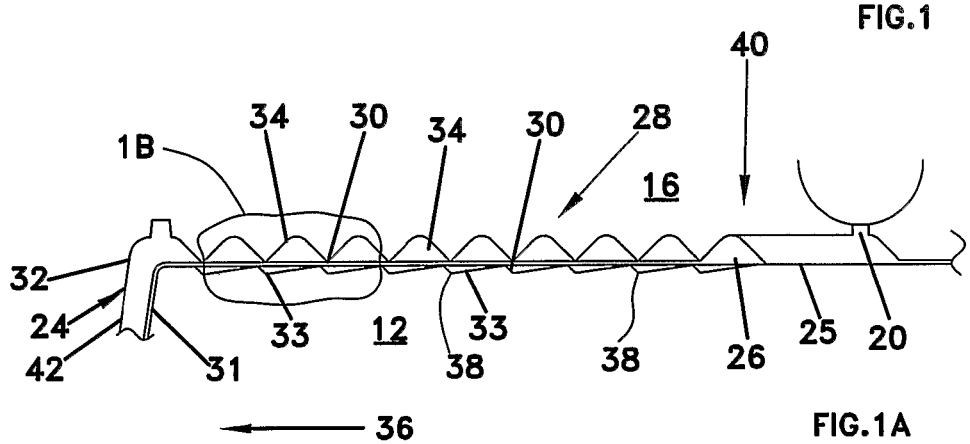
FIG. 1A is an enlarged view of encircled portion 1A of the mold cavity shown in FIG. 1, taken along line 1A-1A in FIG. 2, with said enlarged view illustrating a sectional aspect of a sequence of variable-opening throttles in a base-wall-section flow guide.
Figure 1B:
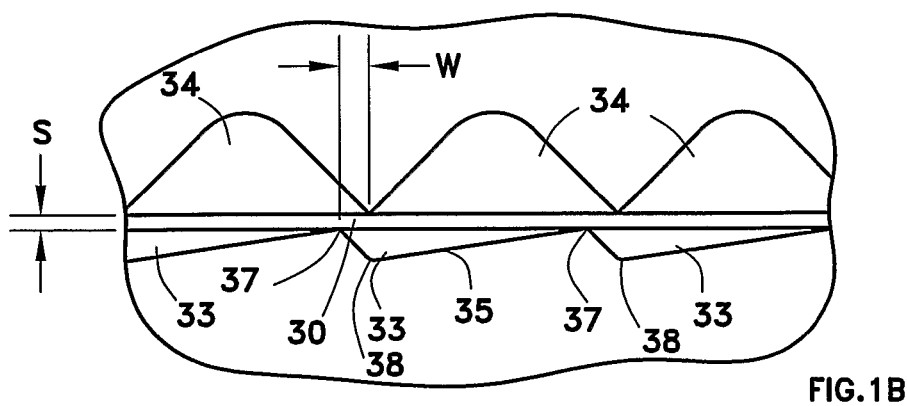
FIG. 1B is a further enlarged view of an encircled portion 1B of the sectional view shown in FIG. 1A, with said further enlarged view better illustrating a preferred embodiment of a portion of the chain of overlapping recesses that form a sequence of variable-opening throttles.
Figure 2:
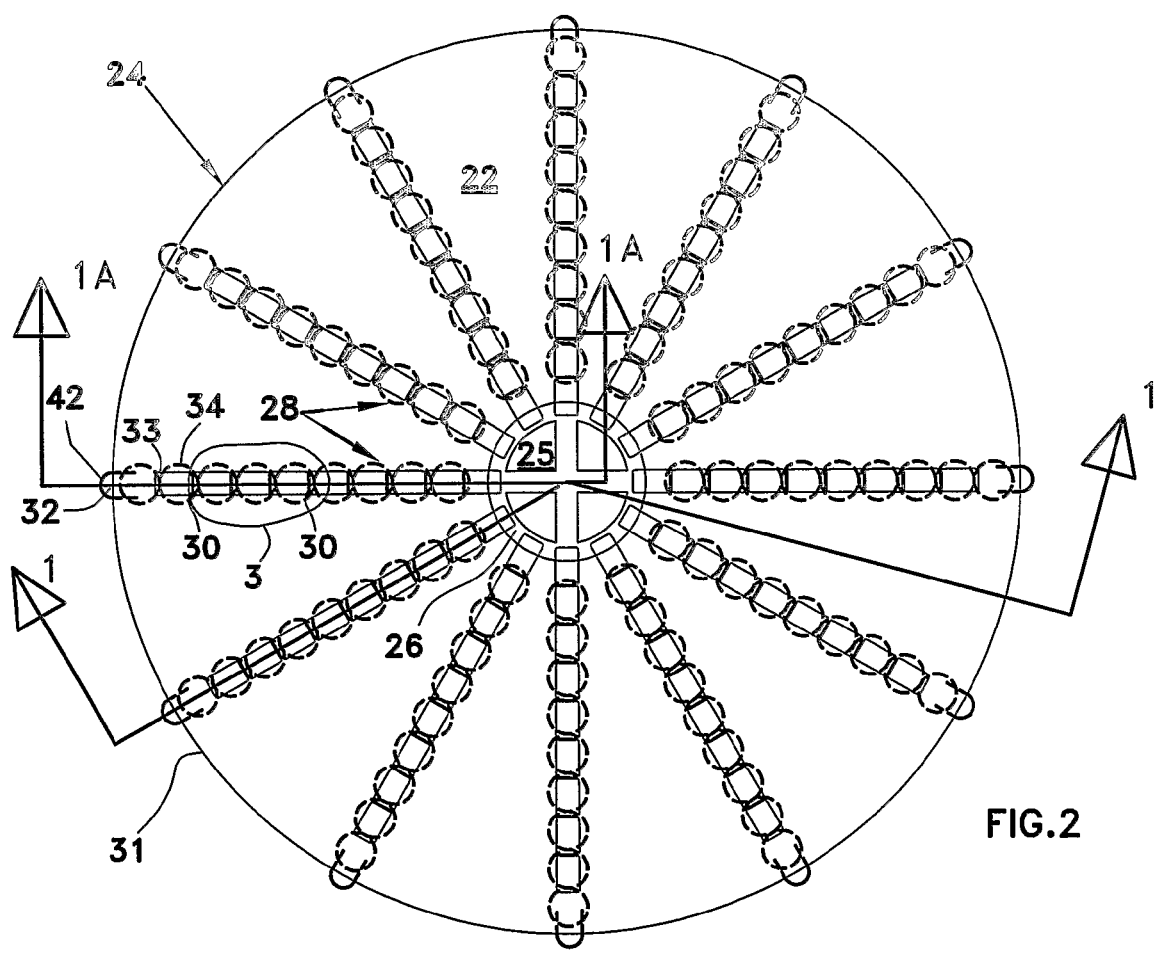
FIG. 2 is an end view of the mold cavity within the mold of FIG. 1, taken along line 2-2 in FIG. 1, and illustrating one preferred embodiment of the approximate broad base-wall dimension aspect of the throttled flow guides shown in FIGS. 1A and 1B.
Figure 4:
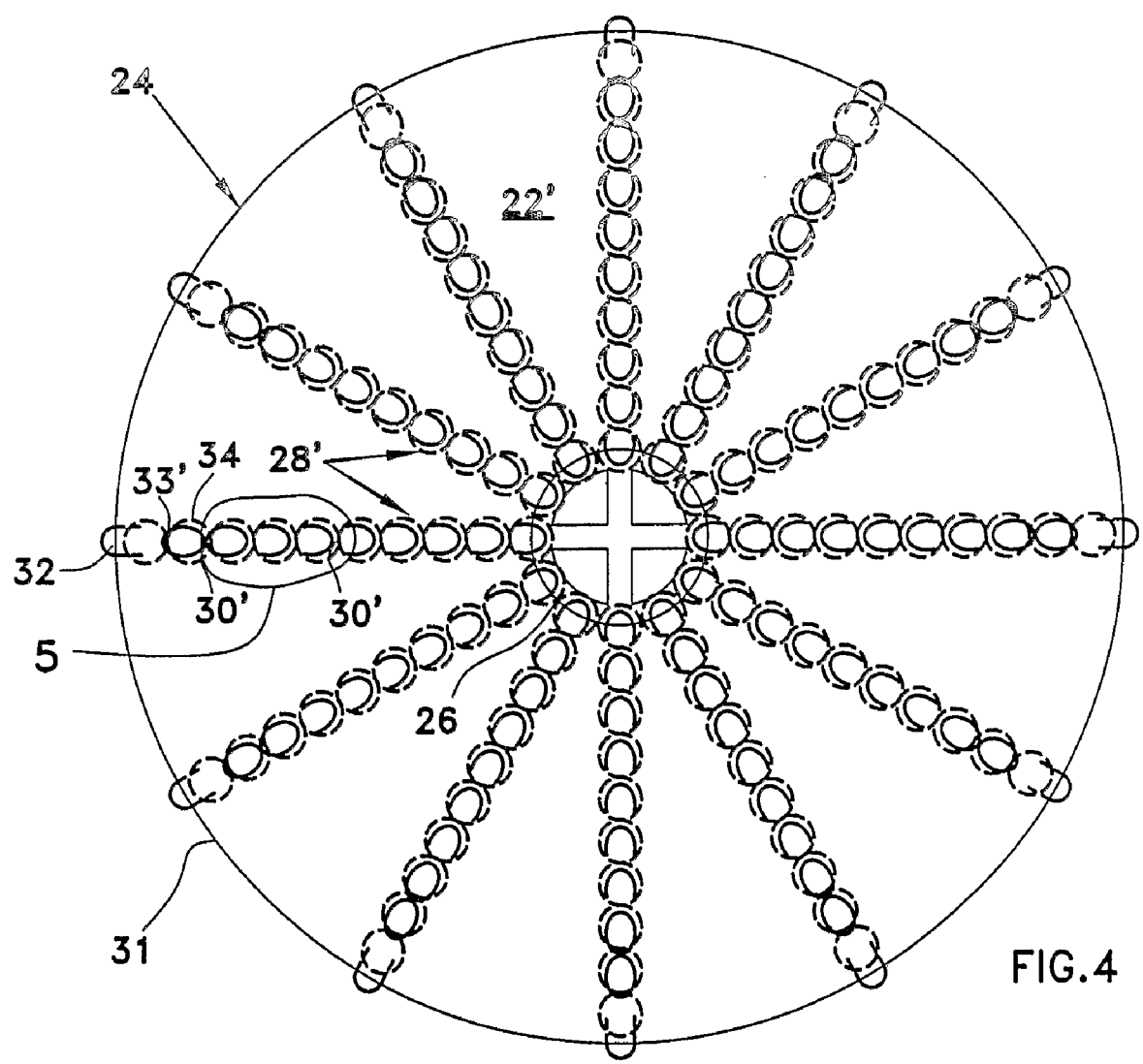
FIG. 4 is an end view of the mold cavity within the mold of FIG. 1, taken along line 2-2 in FIG. 1, and illustrating another preferred embodiment of the approximate broad base-wall dimension aspect of the throttled flow guides shown in FIGS. 1A and 1B.

Within the row of recesses 33 in the core mold part 12, the successive recesses 33 are consecutive, as shown in FIGS. 1B and 3; and within the row of recesses 34 in the adjustable cavity mold part 16, the successive recesses 34 are consecutive, as also shown in FIGS. 1B and 3 In alternative embodiments (not shown), the successive recesses 33 in the core mold part 12 and/or the recesses 34 in the adjustable cavity mold part 16 may be separated, such as shown in FIG. 1A of United States Patent Application Publication No. US-2003-0132551-A1, provided that the recesses 34 in the adjustable cavity mold part 16 are so staggered along the direction of conduction 36 within a given individual base-wall-section flow guide 28 with respect to the recesses 33 in the core mold part 12 as to provide the chain of overlapping recesses 33, 34 that form the sequence of variable-opening throttles 30 having openings that can vary within the given flow guide 28 in order to maintain alignment of mold part 12 and the adjustable cavity mold part 16 in accordance with the present invention.

Referring to FIGS. 1, 1A, 1B, 4, 5, 5A and 5B, in another preferred embodiment the mold cavity 18 is configured in the same manner as the mold cavity in the preferred embodiment described above with reference to FIGS. 1, 1A, 1B, 2, 3, 3A and 3B, except that the successive recesses 33' in the core mold part 12 are elliptical instead of rectangular, and the width of a given throttle 30' is less than the width of the overlapping recesses 33' 34 that form the given throttle 30'. Otherwise, such other preferred embodiment has the same features and alternative features as the preferred embodiment described above with reference to FIGS. 1, 1A, 1B, 2, 3, 3A and 3B.

Still another preferred embodiment is described with reference to FIGS. 1B, 6, 7, 7A and 7B. This embodiment differs from the preferred embodiments described above with reference to FIGS. 3, 3A and 3B and 4, 5, 5A and 5B respectively, in that the series of successive recesses 33" in the second mold part 12 is configured as a series of successive concentric recesses 33" that intersect the generally radially extending rows of successive recesses 34 to shape portions of a plurality of the flow guides 28''' that extend generally radially for conducting the injected plastic material through the base-wall section and thence via the flow guide 32 into the sidewall section of the mold cavity 18.

The injected plastic material is conducted within the base-wall section by means of at least the series of successive concentric recesses 33".

The individual successive recesses 33" do not decline from an edge 37" of an individual second-mold-part recess 33" in the direction of conduction 36 for the given flow guide 28" by more than approximately ten degrees with respect to a plane containing the radially opposed edges 37" of the individual recess 33.

The concentric recesses 33" are approximately circular in the approximate broad dimension of the base-wall section.

In this embodiment, all of the concentric recesses 33" is continuous. In an alternative embodiment (not shown), one or more of the concentric recesses 33" is not continuous.

Figure 6:
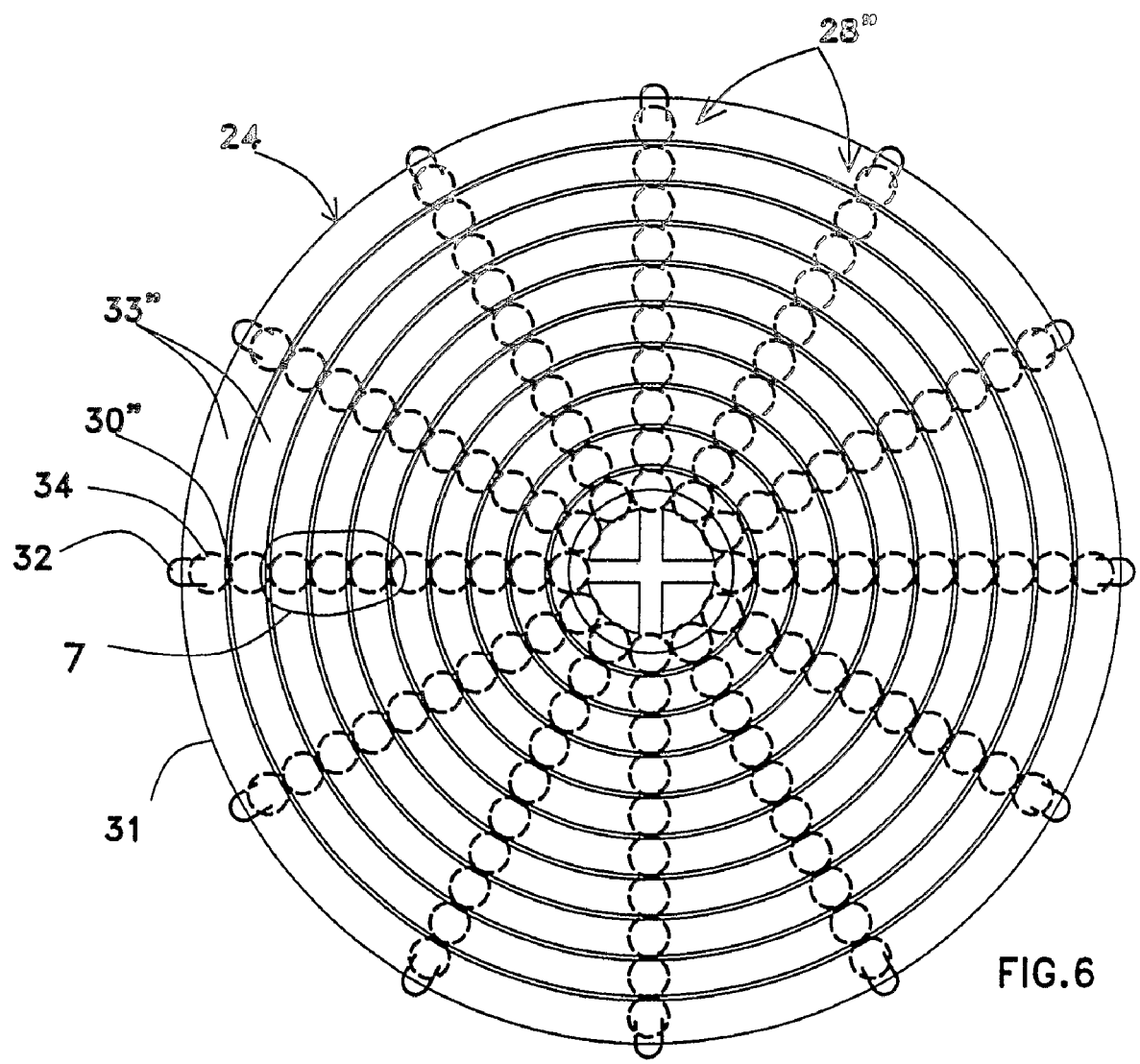
FIG. 6 is an end view of the mold cavity within the mold of FIG. 1, taken along line 2-2 in FIG. 1, and illustrating still another preferred embodiment of the approximate broad base-wall dimension aspect of the throttled flow guides shown in FIGS. 1A and 1B.

Within the series of recesses in the adjustable cavity mold part 16, the successive recesses 33" are consecutive, as also shown in FIGS. 1B, 6 and 7. In alternative embodiments (not shown), the successive recesses 33" in the core mold part 12 and/or the recesses 34 in the adjustable cavity mold part 16 may be separated, such as shown in FIG. 1A of United States Patent Application Publication No. US-2003-0132551-A1, provided that the recesses 34 in the adjustable cavity mold part 16 are so staggered along the direction of conduction 36 within a given individual base-wall-section flow guide 28" with respect to the recesses 33" in the core mold part 12 as to provide the chain of overlapping recesses 33", 34 that form the sequence of variable-opening throttles 30" having openings that can vary within the given flow guide 28" in order to maintain alignment of mold part 12 and the adjustable cavity mold part 16 in accordance with the present invention.

In an alternative embodiment (not shown) the successive recesses in the core mold part 12 are not necessarily concentric. However, in such an alternative embodiment successive strips of recesses in the core mold part 12, that may or may not be continuous, intersect the generally radially extending rows of successive recesses 34 in the adjustable cavity mold part 16 to shape portions of a plurality of the flow guides that extend generally radially for throttling and conducting the injected plastic material in accordance with the present invention.

In alternative embodiments (not shown), the successive recesses in the adjustable cavity mold part 16 may be other than circular in the approximate broad dimension of the base-wall section 22 and/or the successive recesses in the core mold part 12 may be other than rectangular, elliptical or concentric in the approximate broad dimension of the base-wall section 22, as shown herein.

Otherwise, the preferred embodiment described with reference to FIGS. 1B, 6, 7, 7A and 7B has the same features and alternative features as the preferred embodiment described above with reference to FIGS. 1, 1A, 1B, 2, 3, 3A and 3B.

One or more embodiments of the present invention may also include one or more of the various features described in applicants' copending U.S. patent application Ser. No. 10/050,434 filed Jan. 15, 2002, to the extent that such various features are not inconsistent with the present invention. Application Ser. No. 10/050,434 was published on Jul. 17, 2003 as United States Patent Application Publication No. US-2003-0132551-A1. The disclosure of application Ser. No. 10/050,434 is incorporated herein by reference thereto. Terms of language that are used both herein and in application Ser. No. 10/050,434 do not necessarily have the same meaning herein as in the context of said application.

The benefits specifically stated herein do not necessarily apply to every conceivable embodiment of the present invention. Further, such stated benefits of the present invention are only examples and should not be construed as the only benefits of the present invention.

While the above description contains many specificities, these specificities are not to be construed as limitations on the scope of the present invention, but rather as examples of the preferred embodiments described herein. Other variations are possible and the scope of the present invention should be determined not by the embodiments described herein but rather by the claims and their legal equivalents. The claims require no implicit limitations. Each claim is to be construed explicitly as stated, or by its legal equivalent.

Regarding the method claims, except for those steps that can only occur in the sequence in which they are recited, and except for those steps for which the occurrence of a given sequence is specifically recited or must be inferred, the steps of the method claims do not have to occur in the sequence in which they are recited.

The invention claimed is:

1. A method of injection molding a plastic product having a base wall and a sidewall, the method comprising the steps of:
   (a) shaping a mold cavity to form the plastic product by combining a first mold part and a second mold part in opposition to one another;
   (b) injecting fluid plastic material into a base-wall section of the mold cavity; and
   (c) conducting said injected plastic material through at least one flow guide in the base-wall section and thence into a sidewall section of the mold cavity;
   wherein step (a) comprises the step of:
   (d) shaping a portion of a given said base-wall section flow guide by partially opposing a row of successive recesses in the first mold part with a series of successive recesses in the second mold part with the recesses in the first mold part being so staggered with respect to the recesses in the second mold part as to provide a chain of overlapping recesses that form a sequence of variable-opening throttles having openings that can vary within the given flow guide whenever the alignment between the combined first and second mold parts varies in response to variations in the thickness of a region of the sidewall section into which injected plastic material is conducted from the given flow guide so that upon an increase in the thickness of said region the openings of said throttles in the given flow guide decrease and so that upon a decrease in the thickness of said region the openings of said throttles in the given flow guide increase;
   wherein the recesses in the second mold part are shallow in relation to the recesses in the first mold part.

2. A method according to claim 1, wherein the series of successive recesses in the second mold part is configured as a row of successive recesses.

3. A method according to claim 1, wherein a plurality of said rows of successive recesses extend generally radially in the first mold part; and
   wherein the series of successive recesses in the second mold part is configured as a series of successive concentric recesses that intersect said generally radially extending rows of successive recesses to shape portions of a plurality of said flow guides that extend generally radially for conducting said injected plastic material through the base-wall section and thence into the sidewall section of the mold cavity.

4. A method according to claim 3, further comprising the step of:
   (e) conducting the injected plastic material within the base-wall section by means of at least the series of successive concentric recesses.

5. A method according to claim 3, wherein the individual said successive second-mold-part recesses do not decline from an edge of a said individual second-mold-part recess in the direction of conduction for the given flow guide by more than approximately ten degrees with respect to a plane containing the radially opposed edges of said individual recess.

6. A method according to claim 3, wherein the concentric second-mold-part recesses are approximately circular in the approximate broad dimension of the base-wall section.

7. A method according to claim 3, wherein at least one of the concentric second-mold-part recesses is continuous.

8. A method according to claim 1, wherein the declining portions of individual said successive second-mold-part recesses do not decline by more than approximately forty-five degrees with respect to a plane containing opposing edges of said individual recess in the direction of said declination.

9. A method according to claim 1, wherein a portion of individual said successive second-mold-part recesses that declines from an edge of a said individual second-mold-part recess in the direction of conduction for the given flow guide does not incline more than approximately ten degrees with respect to a plane containing opposing edges of said individual recess in said direction.

10. A method according to claim 1, wherein within the row of first-mold-part recesses, the successive recesses are consecutive.

11. A method according to claim 10, wherein within the series of second-mold-part recesses, the successive recesses are consecutive.

12. A method according to claim 1, wherein within the series of second-mold-part recesses, the successive recesses are consecutive.

13. A method according to claim 1, wherein the depth of individual said successive recesses in the second mold part is not more than approximately twenty-five-percent of the depth of individual said successive recesses in the first mold part.

14. A method according to claim 1, wherein the depth of individual said successive recesses in the second mold part are not more than approximately one-half millimeter.

15. A method according to claim 1, wherein the depth of individual said successive recesses in the second mold part are not more than approximately one-quarter-millimeter.

* * * * *